(12) United States Patent
Hamidi

(10) Patent No.: US 8,146,694 B2
(45) Date of Patent: Apr. 3, 2012

(54) SWAPPABLE MODULATED BATTERY PACKS SYSTEM FOR ELECTRICALLY DRIVEN VEHICLE

(76) Inventor: Vahid Hamidi, Aliso Viejo, CA (US)

( * ) Notice: Subject to any disclaimer, the term of this patent is extended or adjusted under 35 U.S.C. 154(b) by 559 days.

(21) Appl. No.: 12/321,241

(22) Filed: Jan. 20, 2009

(65) Prior Publication Data

US 2010/0181129 A1 Jul. 22, 2010

(51) Int. Cl.
*B60R 16/04* (2006.01)
(52) U.S. Cl. .................................................. 180/68.5
(58) Field of Classification Search ............... 180/65.1, 180/65.22, 68.5
See application file for complete search history.

(56) References Cited

U.S. PATENT DOCUMENTS

| | | | | |
|---|---|---|---|---|
| 1,678,033 A * | 7/1928 | Brumbaugh | ................ | 180/68.5 |
| 1,993,893 A * | 3/1935 | Page, Jr. | ................ | 429/96 |
| 3,799,063 A * | 3/1974 | Reed | ................ | 104/34 |
| 3,838,745 A * | 10/1974 | Kappei | ................ | 180/68.5 |
| 3,930,552 A * | 1/1976 | Kunkle et al. | ................ | 180/68.5 |
| 3,989,118 A * | 11/1976 | Hansen | ................ | 180/68.5 |
| 4,723,618 A * | 2/1988 | Coonradt | ................ | 180/68.5 |
| 5,297,645 A * | 3/1994 | Eckersley et al. | ................ | 180/68.5 |
| 5,301,765 A * | 4/1994 | Swanson | ................ | 180/68.5 |
| 5,305,513 A * | 4/1994 | Lucid et al. | ................ | 29/402.08 |
| 5,360,307 A * | 11/1994 | Schemm et al. | ................ | 414/343 |
| 5,542,488 A * | 8/1996 | Nixon | ................ | 180/65.1 |
| 5,585,205 A * | 12/1996 | Kohchi | ................ | 429/99 |
| 6,564,893 B2 * | 5/2003 | Lipman | ................ | 180/68.5 |
| 6,631,775 B1 * | 10/2003 | Chaney | ................ | 180/68.5 |
| 6,938,553 B2 * | 9/2005 | Tamaki et al. | ................ | 104/34 |
| 2001/0013437 A1 * | 8/2001 | Husted et al. | ................ | 180/65.1 |
| 2001/0052433 A1 * | 12/2001 | Harris et al. | ................ | 180/68.5 |
| 2004/0173408 A1 * | 9/2004 | Szymanski et al. | ................ | 187/222 |
| 2005/0274556 A1 * | 12/2005 | Chaney | ................ | 180/68.5 |
| 2006/0070780 A1 * | 4/2006 | Lin | ................ | 180/68.5 |
| 2007/0107963 A1 * | 5/2007 | Chiu | ................ | 180/68.5 |
| 2007/0151785 A1 * | 7/2007 | Huang | ................ | 180/68.5 |
| 2008/0006459 A1 * | 1/2008 | Niebuhr | ................ | 180/68.5 |
| 2009/0004554 A1 * | 1/2009 | Reed et al. | ................ | 429/97 |

FOREIGN PATENT DOCUMENTS

WO WO 9408814 A1 * 4/1994

* cited by examiner

*Primary Examiner* — John R Olszewski
(74) *Attorney, Agent, or Firm* — Novatech IP Law; Sean O'Neill

(57) ABSTRACT

A system for swappable battery pack for electric vehicle is disclosed. Each battery pack units is comprising a battery compartment housing, a battery carrier rack which is slidable within the battery compartment housing via at least one linear actuator. The battery carrier rack also contains a plurality of modulated battery packs nested into its docking enclosures. In order to transfer or swap the modulated battery packs, the slidable battery carrier rack must projects out from its compartment in predetermined direction and distance and then the nested modulated battery packs can easily be detached from its docking enclosures.

6 Claims, 12 Drawing Sheets

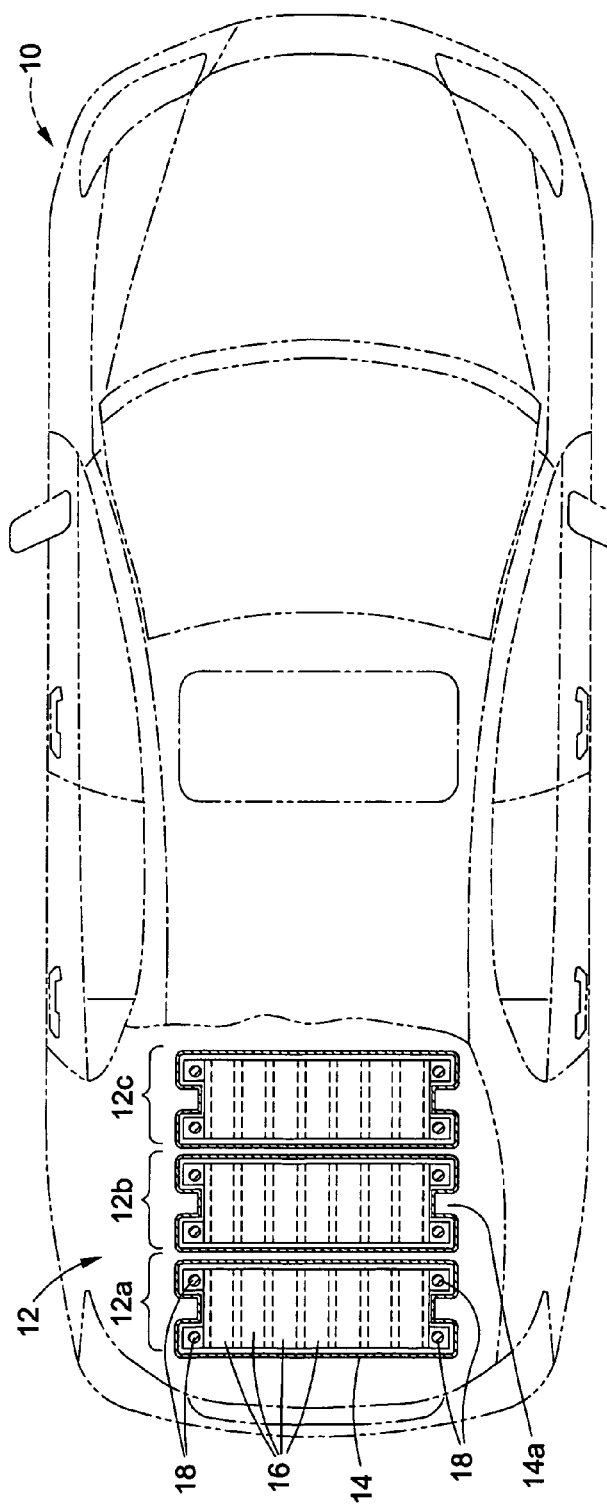
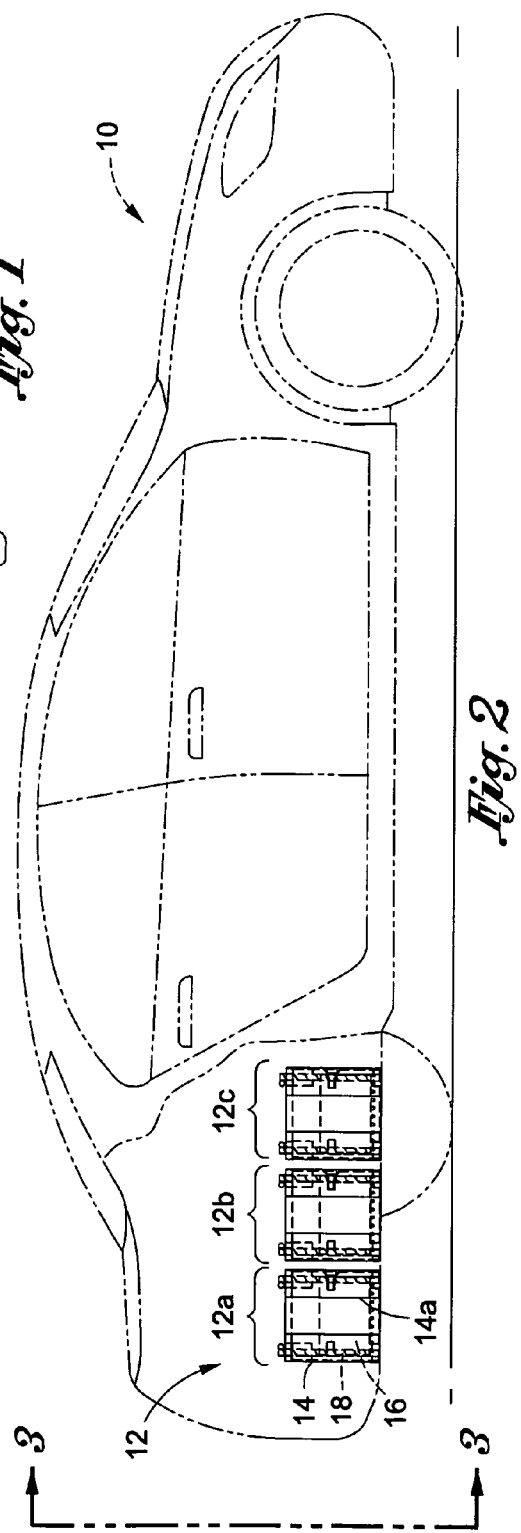

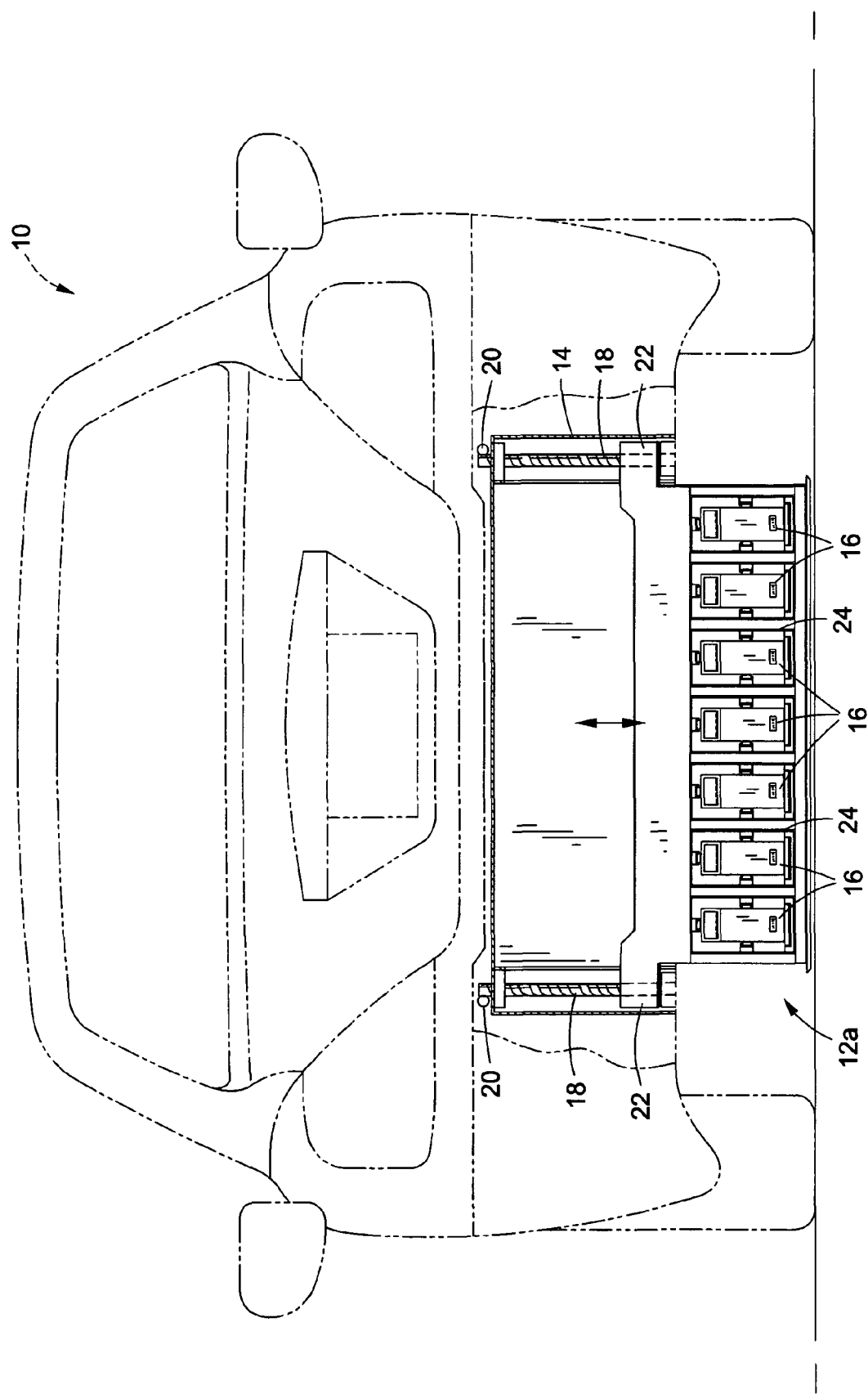

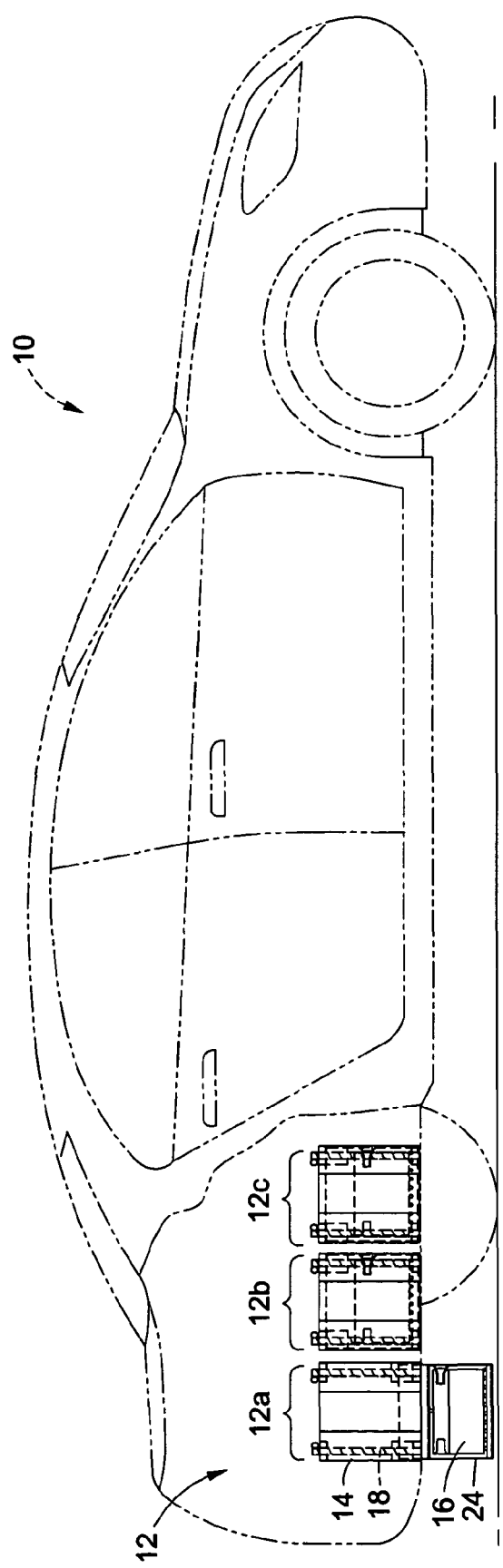

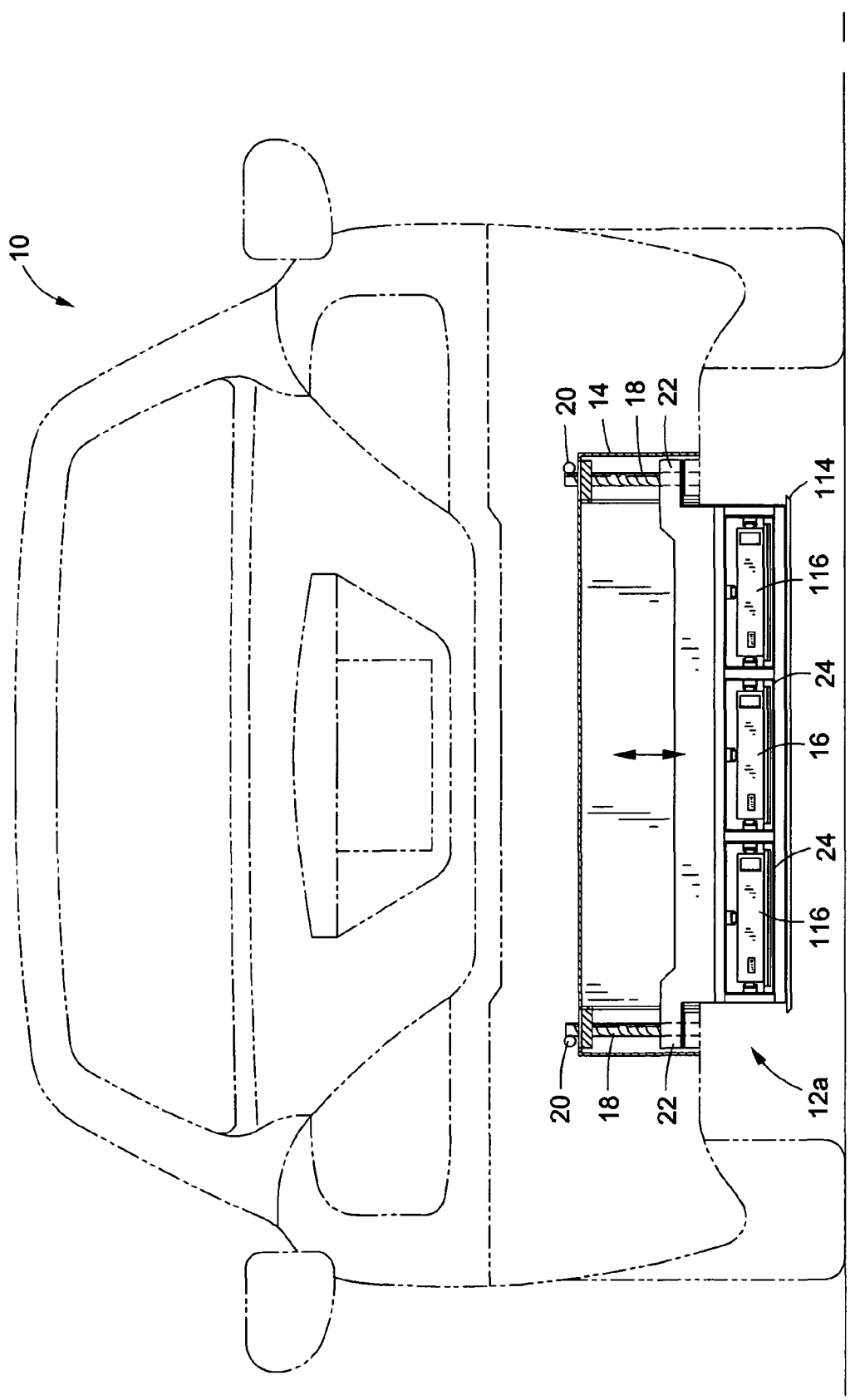

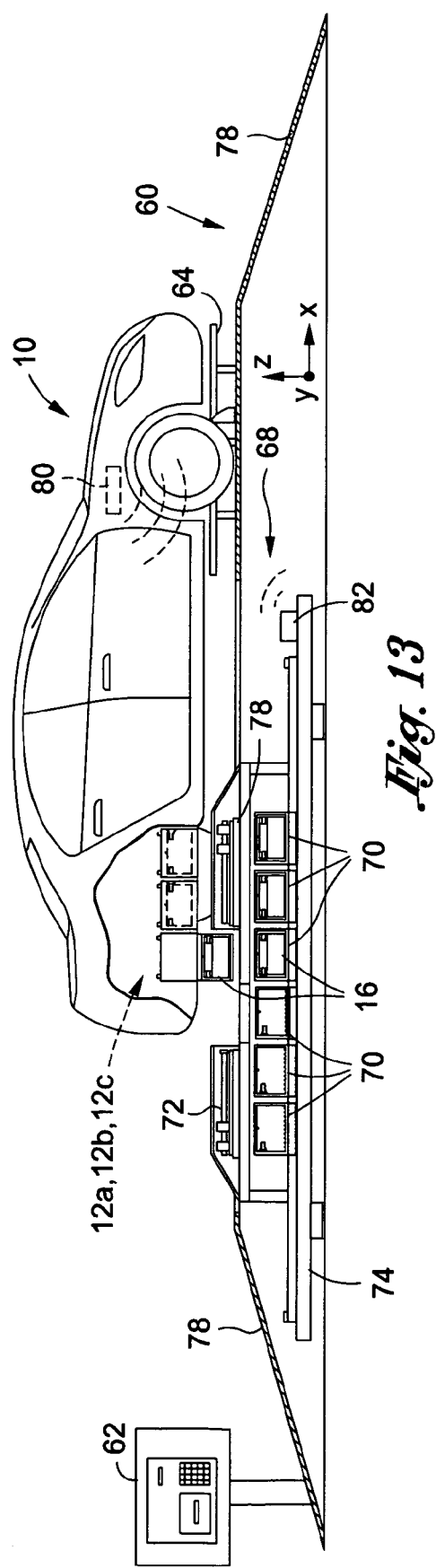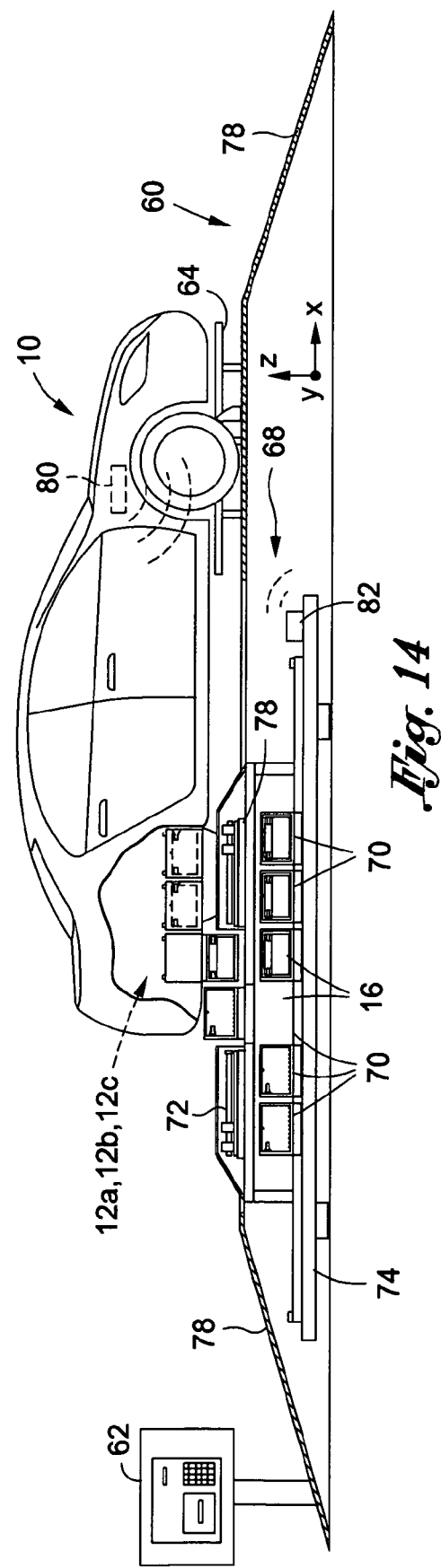

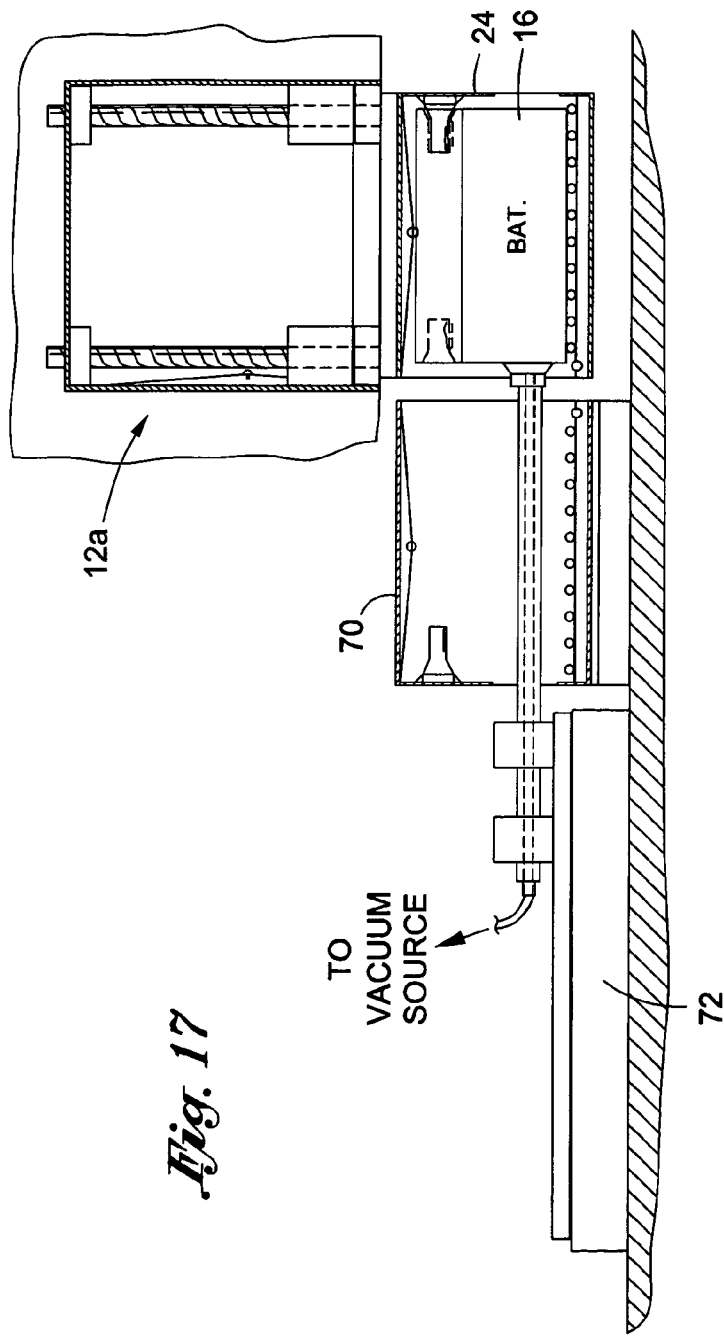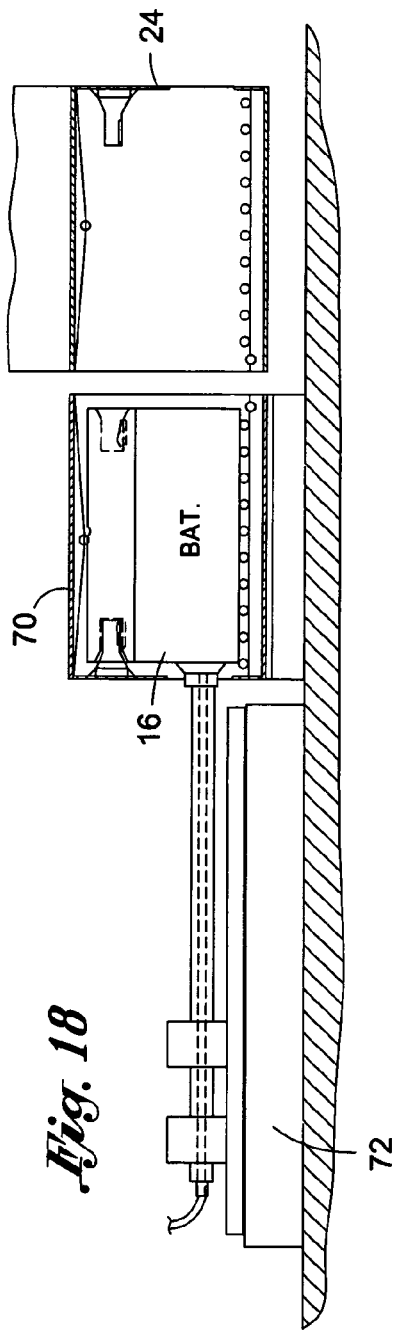
Fig. 17
Fig. 18

SWAPPABLE MODULATED BATTERY PACKS SYSTEM FOR ELECTRICALLY DRIVEN VEHICLE

FIELD OF THE INVENTION

The present invention relates to electrical vehicle battery packs. More particularly the arrangement of battery packs that are modulated and swappable.

BACKGROUND OF THE INVENTION

Architecturally, an electric vehicle battery pack is comprised of multi-battery modules, fuses, bus bars and safety circuitry system which are combined into one large battery enclosure. Combining all the parts in one package makes the battery pack very heavy. Due to the size and weight of the battery pack, the electric vehicle has limited range of travel. And in case of traveling a long distance journey, normally a diver has to stop at several charging stations to recharge the battery, and recharging the battery is time consuming for drivers and some don't have that much time to waste.

The idea of swappable large battery pack with a fresh battery pack was proposed many times before, and seems to solve the problem neatly. But it has not been done by auto industry for many reasons. One of the reasons is that battery pack is not standardized due to its shape and capacity among auto-industry. The second issue is the battery packs are heavy and usually weights around 500 lbs to 900 lbs and exchanging these batteries are huge tasks. The third problem is the high cost associated with maintaining a standing store of fresh packs at battery station.

However, this invention overcomes the shortcomings and solving some of the problems associated with large battery pack that exist today. The new vehicle's battery pack system replaces the huge battery pack with several battery pack arrangement units. Each units contains smaller modulated battery packs. The small size and weight of these modulated battery packs, allow driver to quickly exchange the depleted batteries with charged ones at battery exchange station with respect to charging the battery pack for few hours. Also it is easier to check these swappable battery packs for defective module and monitor each one of them either by an automated exchange/charging station or manually by auto technician.

The use of small modulated battery packs is an important factor for auto-industry to standardized EV battery. For example electronic devices uses standard batteries (e.g. AAA, AA, C, D batteries, etc.), the electric vehicle's battery packs can also be standardized for E-bike, E-scooters, and EV cars, EV buses and etc. Such standards will advances electric vehicle into next level for more practical use.

SUMMARY OF THE INVENTION

It is an object of the present invention to provide a system for electric vehicle's battery pack. This system provides multi battery pack units. Each unit comprising a battery compartment housing, a battery carrier rack which is slidable within the battery compartment housing via at least one linear actuator. The battery carrier rack also contains a plurality of modulated battery packs nested into its docking enclosures. In order to transfer or swap the modulated battery packs, the slidable battery carrier rack projects out from its compartment in predetermined direction and distance and then the nested modulated battery packs can easily be detached from its docking enclosures.

It is another object of this invention to add arrays of battery pack units as needed to provide extra mileage for the electric vehicle. The battery pack unit can be placed and located anywhere in the vehicle even on the roof with respect to direction of slidablities of battery carrier rack.

It is yet another object of this invention to secure modulated battery packs in proper position to its docking terminals due to vehicle vibrations and road bumps. Since the modulated battery packs are removable and transferable, it must be connected surely and securely to vehicle connector via guided tracks and spring-loaded rollers. Otherwise any loose connections would result in loss of power.

It is yet another object of this invention to show the method of swapping the modulated battery packs with regards to its arrangements from vehicle to an automated battery transfer/charge station and vice versa.

Further objects and advantages of this invention will become apparent from consideration of the drawings and descriptions that follow.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a top plan view of the possible arrangement of battery pack units showing the present invention.

FIG. 2 is a side elevation view of FIG. 1.

FIG. 4 is similar to FIG. 3 except the battery pack carrier is extended outwardly.

FIG. 5 is side elevation view similar to FIG. 2, but showing one of the battery pack unit in extended position.

FIG. 12 is an end view of alternative embodiment of battery pack unit showing battery pack sideway layout in order to save more space in the batteries arrangement in the vehicle with respect to its low profile.

FIG. 13 is a side sectional view of a battery transfer/charging station in conjunction with swappable modulated battery backs in electric vehicle.

FIG. 14 is similar view shown in FIG. 13, but one of the battery transfer magazines is deployed and ready for battery pack transfer.

FIG. 17 is cutaway section view of alternative embodiment of linear actuator in conjunction with battery station magazine and vehicle's battery pack carrier rack.

FIG. 18 is a similar view to shown in FIG. 17, but the battery pack is transferred and positioned into battery station's magazine via actuator suction force.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 3:
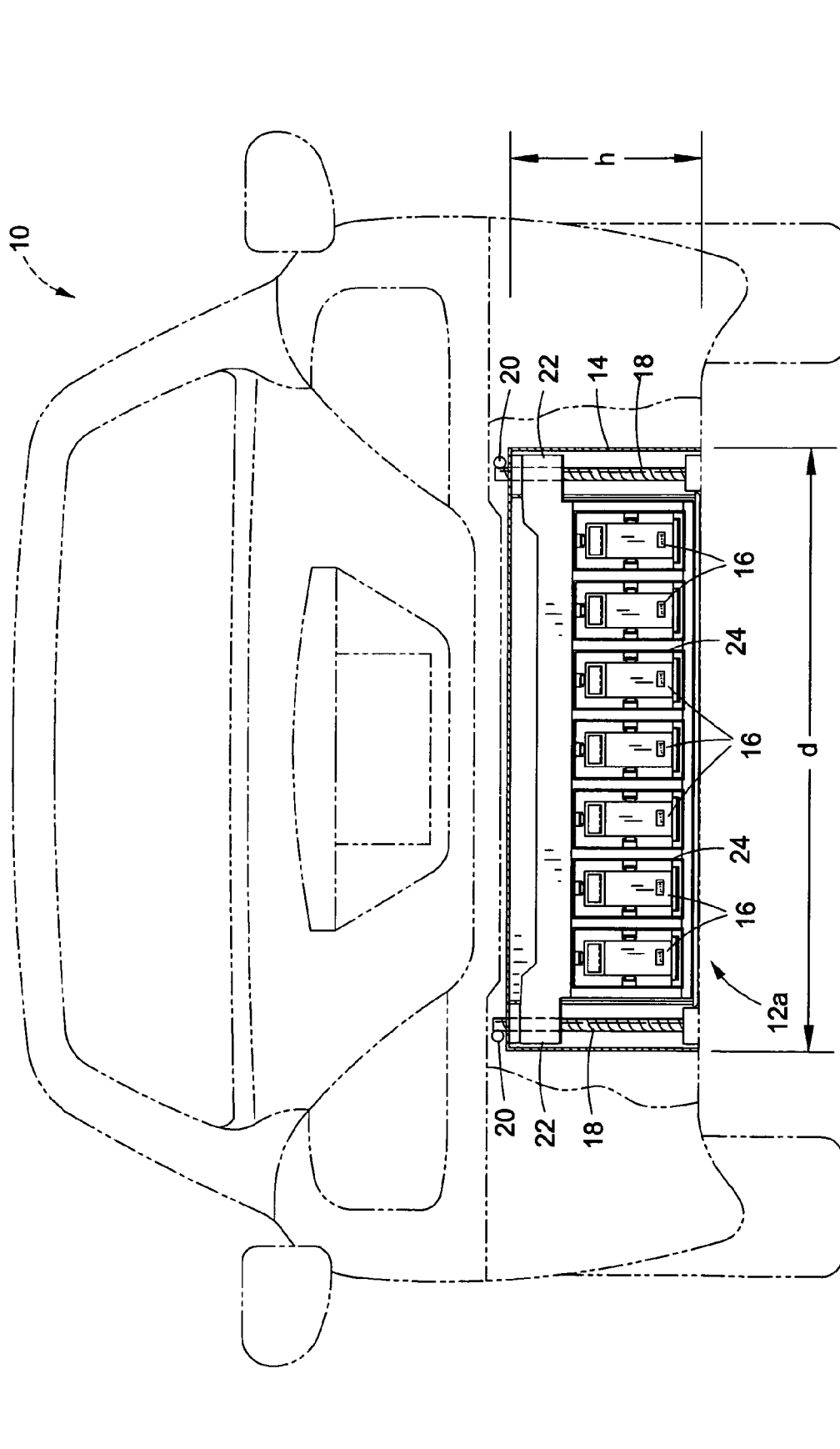
FIG. 3 is a rear elevation view taken along line 3-3 in FIG. 2.
Figure 7:
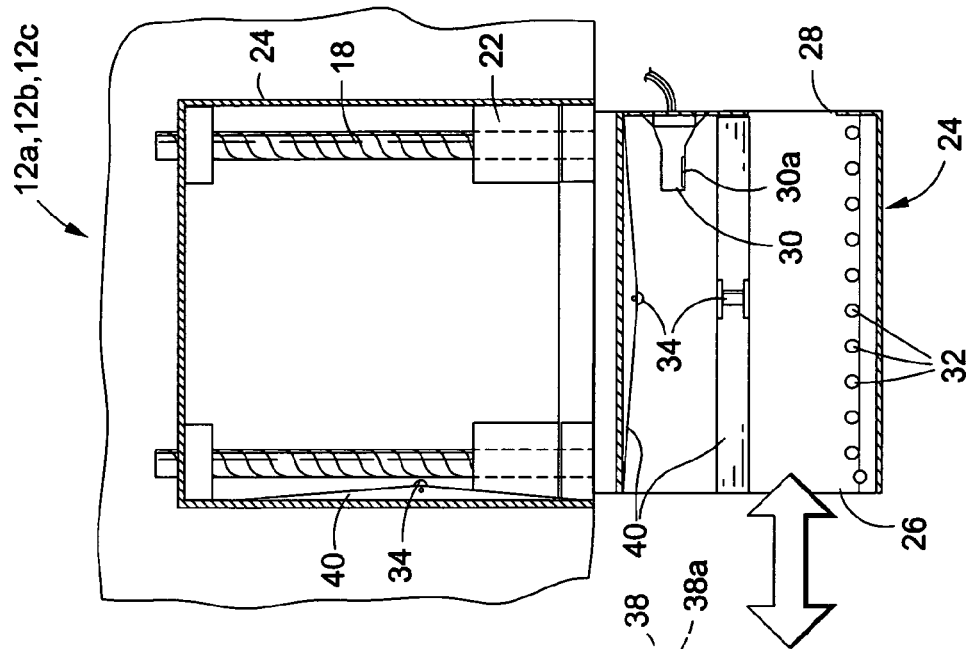
FIG. 7 is an exploded view shown in FIG. 6.

FIG. 1-3 are illustrating a series of battery pack arrangement units 12a, 12b, 12c, which are positioned underneath an electric vehicle 10. These battery pack units are flushed at the bottom of the vehicle 10 when assembled and it can be placed and orientated anywhere underneath the vehicle. Preferably, these battery pack units 12a, 12b, 12c, are located near the rear end of the vehicle 10. Each battery pack unit comprising a battery compartment housing 14, a battery carrier rack 22 which carries a plurality of small modulated battery packs 16. Each modulated battery pack 16 is placed into a docking enclosure 24.

In order to extend out battery carrier rack 22 from its battery compartment housing which is affixed to vehicle, at least one motor 20 is activating the linear actuator 18 and the battery carrier slides out in linear direction. The battery compartment housing also shaped in a way to create rigid track 14a for sliding battery carrier rack. If the motor 20 malfunction, the carrier can manually geared down from the bottom by using the actuator's shaft. Once the battery carrier rack is out of its compartment, the modulated battery packs can be accessed as seen in FIG. 4-5. When modulated battery packs are exposed, it can easily be swap or replaced by either automated battery transfer station or by a auto technician.

Figure 6:
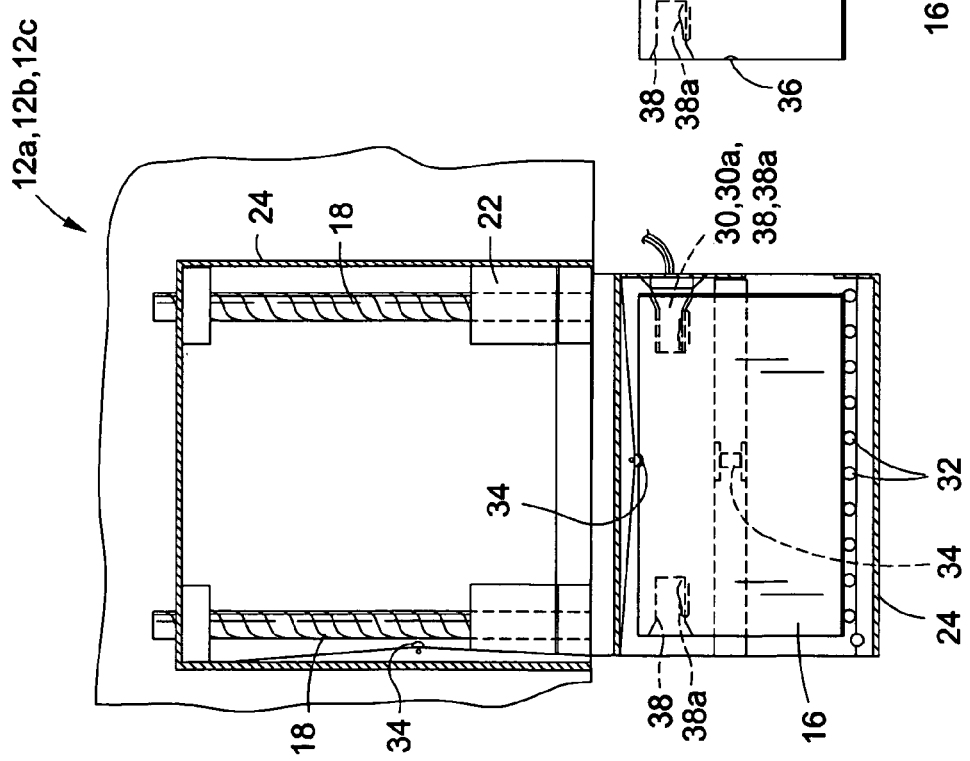
FIG. 6 is an enlarged partial side view of assembled battery pack unit showing in FIG. 5.
Figure 9:
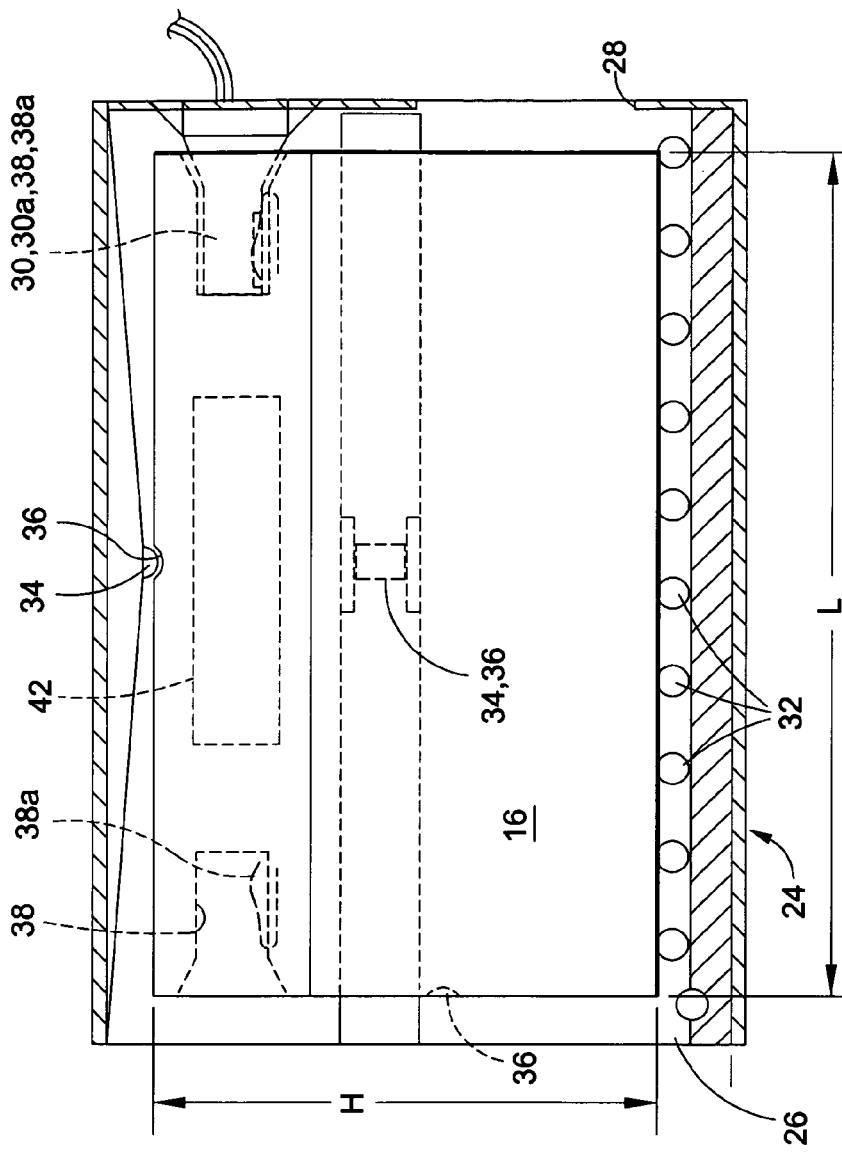
FIG. 9 is cross section view taken along line 9-9 in FIG. 8.
Figure 8:
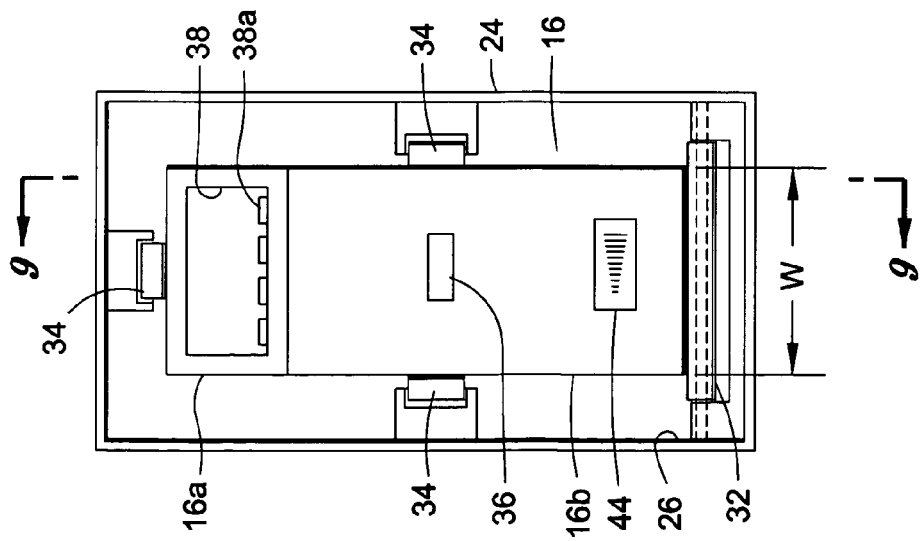
FIG. 8 is an assembled view of a modulated battery pack and its docking enclosure.
Figure 11:
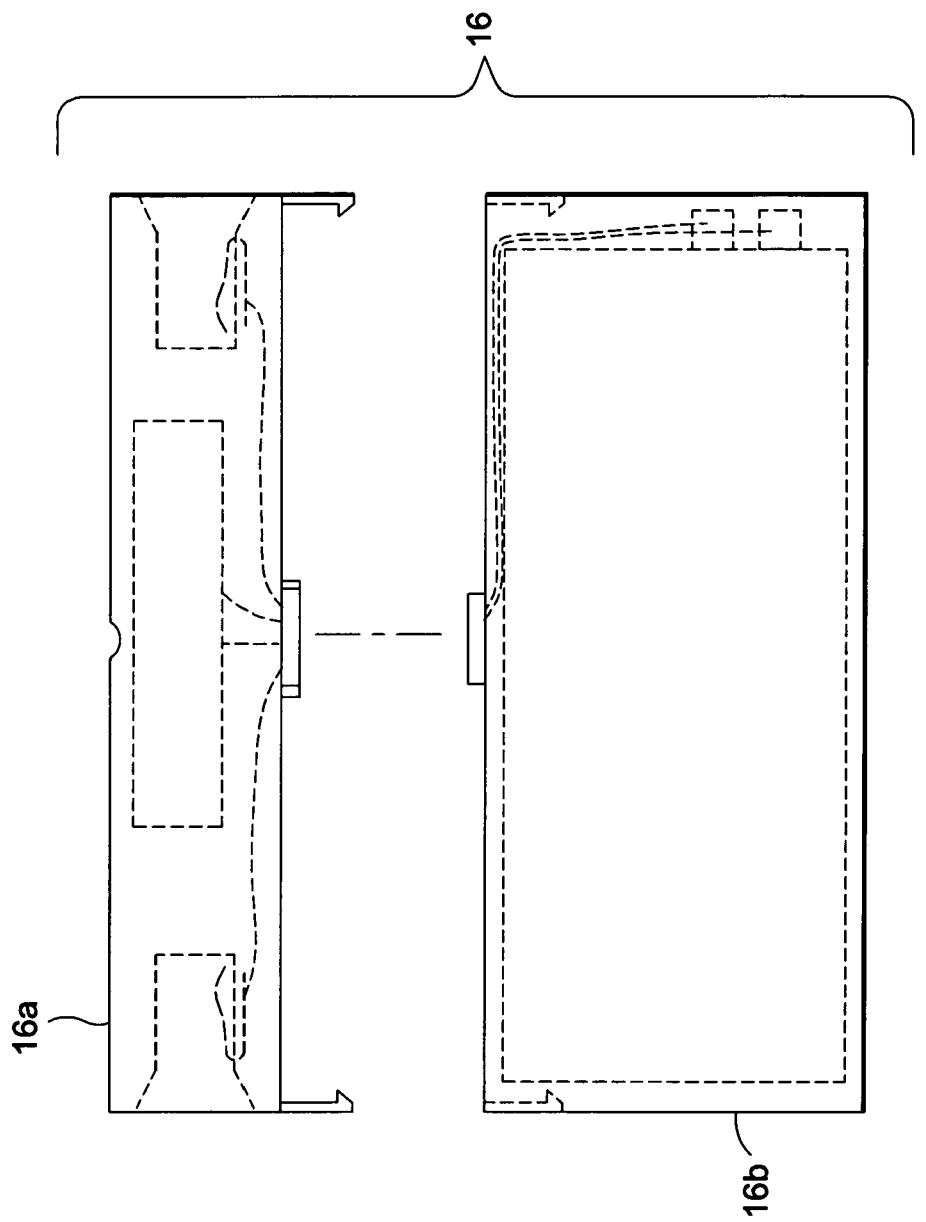
FIG. 11 is an exploded view shown in FIG. 10.
Figure 10:
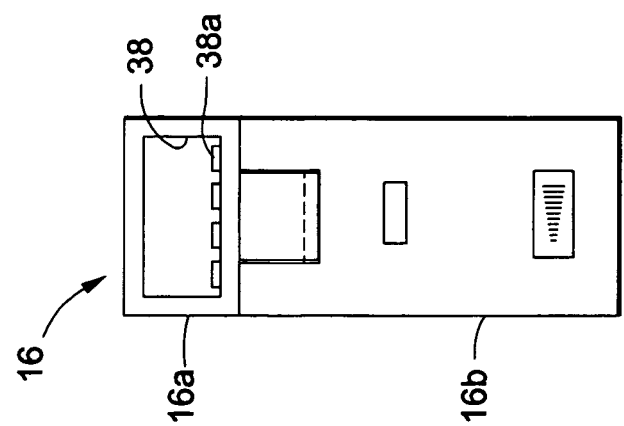
FIG. 10 is a front view of alternative embodiment of battery module enclosure.

FIG. 6 is also showing a sectional side view of one of the battery pack unit. Modulated battery pack 16 is shown in nested docking enclosure 24 and secured by top and side spring-loaded rollers 34, in which the battery case positions itself with its indentations 36. Battery electrical connections are done by blind mate connection to a receptacle 30 at the end of docking enclosure 24. The battery pack plug in connector 38 and its terminal 38a mate with docking enclosures receptacle connector 30 and its terminals 30a when the battery pack is pushed in such that the battery pack will provide power to electric vehicle.

For placement of the battery pack 16 into the its docking enclosure 24, a set of rollers 32 are provided at the bottom side of enclosure. Simply the battery pack 16 enters the open end 26 of the docking enclosure 24 and rolls into position with minimum applicable force. The docking enclosures 24 may also have an open end on both side or partially open on one end 28. The open ends docking enclosure are for replacing & transferring the battery pack from both ends. In some cases the docking enclosure may need to have one open end and the other end is sealed, be closed the battery pack can be replaced from the open end only.

Referring to FIG. 7-11, modulated battery pack 16 optionally can be made of two main pieces which can fastened or snapped together. The battery pack may have a lower portion 16a made of waterproof and fire retardant aluminum or stainless steel which contains all battery cells such as polymer Li-Ion cells, and the upper portion 16b contains blind mate plug in connectors 38, 38a at each ends, and monitoring circuitry 42. The monitor circuitry is for balancing the amount of charge or discharge that battery cells required. It is best to monitor each battery pack per module. The two piece design of battery pack is also good practice for recycling all parts.

Each modulated battery pack size can be as small as E-bike's battery pack, which is approximately 11.9" in length (L), 4.9" in height (H), and 2.6" in width (W). The battery pack may also include a charge status indicator 44 in front portion of battery case to monitor the energy level of the battery pack. An auto technician can visually check each battery packs before any testing or replacing.

FIG. 12 is showing an alternative embodiment 112a of the present invention to provide even more low profile battery pack unit. The modulated battery packs 116 are positioned and reoriented on its sides to save more space with respect to battery pack unit arrangement in vehicle. A rubber seal 114 around the bottom edge of battery carrier rack seals the battery compartment when the battery unit is in retracted position. The rubber seal 114 prevents any debris to enter into the battery compartment and when it is in seal position, it is flush with the bottom surface of vehicle.

Now referring to FIG. 13, a low profile battery transfer/charge station 60 showing in conjunction with vehicle's battery pack units 12a, 12b, 12c. After vehicle's computer 80 send signals for data exchange with battery station computer transceiver 82, the first battery pack unit 12a position itself in extended position and gets ready for transferring its depleted battery packs. At this time, battery station exchanging assembly unit 68 will adjust itself to the proper position with respect to X, Y and Z coordinates via related sensors and actuator. Once it is positioned to vehicle battery carrier rack 22, an empty switchable battery magazine 70 will be deployed by station computer to be in front of vehicle's battery carrier rack as shown in FIG. 14.

Figure 15:
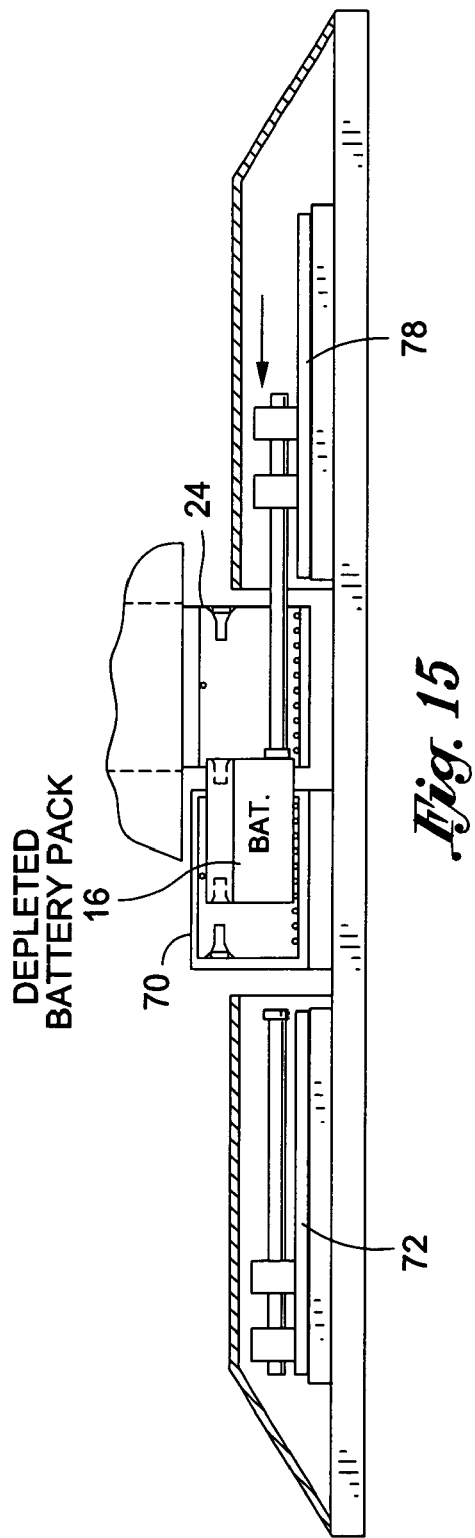
FIG. 15 is an enlarged view of battery exchanged assembly shown in FIG. 15, but it is in processing of transferring depleted battery pack via a linear actuator from vehicle to an empty battery exchange magazine.

In FIG. 15, a depleted battery is pushed away into the station magazine 70 by a linear actuator 78. Once the depleted battery nested into station's magazine and its docking enclosure, it will be connected to battery station charging system and battery station start the charging process.

Figure 16:
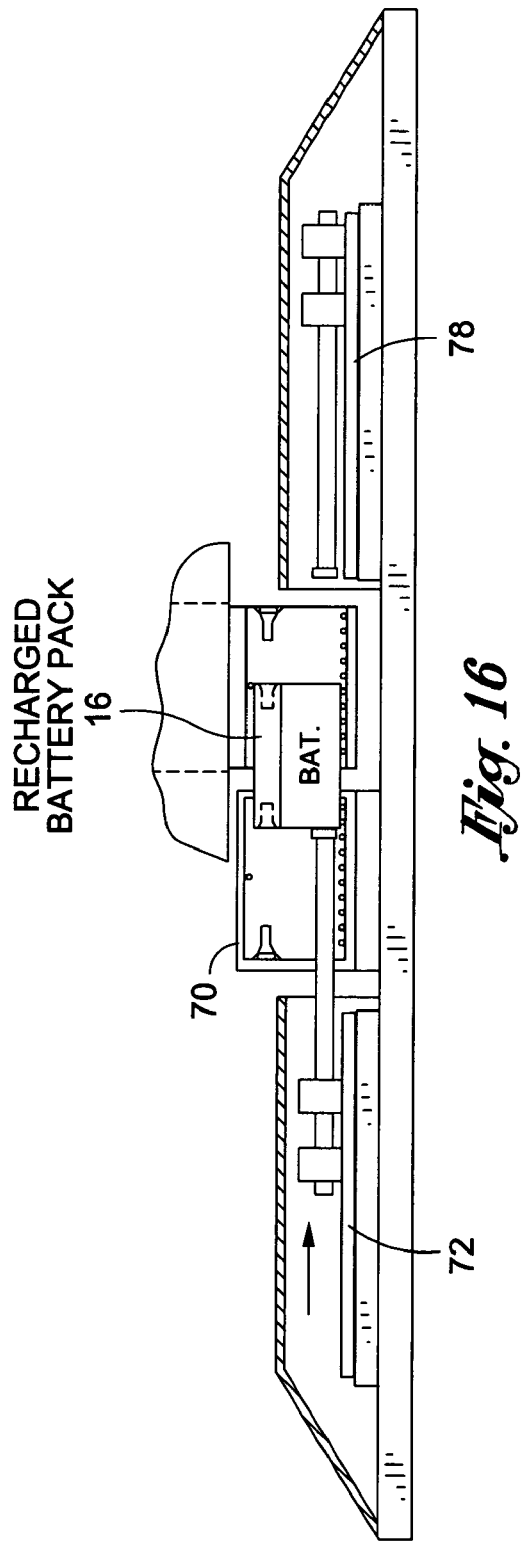
FIG. 16 is similar view shown in FIG. 15, but it is in process of transferring recharged battery pack via an opposite linear actuator from battery exchange magazine to vehicle's battery carrier rack.

For delivery of charged battery packs from station to vehicle battery carrier rack, battery station deploy a battery magazine 70 with fully charged battery packs. As seen in FIG. 16, the fully charged battery pack pushed away from station magazine 70 into vehicle's battery carrier rack 22 via an actuator 72. At this time the vehicle receives fully charged modulated battery packs. The battery carrier rack retracts into its compartment and electric vehicle waits for a new signal from station for of the next transfer process. Meanwhile, the station exchange assembly 68, reposition itself for the next battery transfer.

FIG. 17-18 illustrates a linear actuator with applicable suction force. Alternatively, this type of actuator can transfer the modulated battery packs via its pull or push force. The linear actuator 72 uses the suction force via a suction cup the applied to battery pack frontal face and then actuator can pull the battery pack from its position and displace it into station magazine 70. Another advantage of applying the suction force is for better grip or control over the battery pack displacement process.

Figure 20:
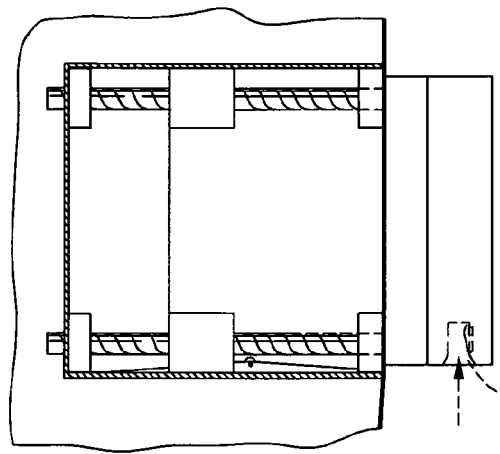
FIG. 20 is a side view of an alternative charging plug in connector in battery pack carrier rack.
Figure 21:
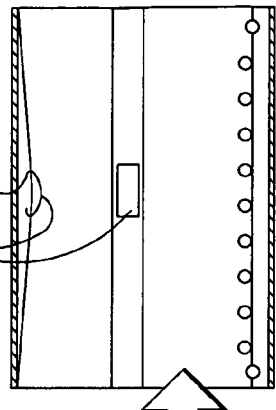
FIG. 21 is an alternative embodiment of battery pack terminal connection to its docking enclosures terminal contacts.
Figure 19:
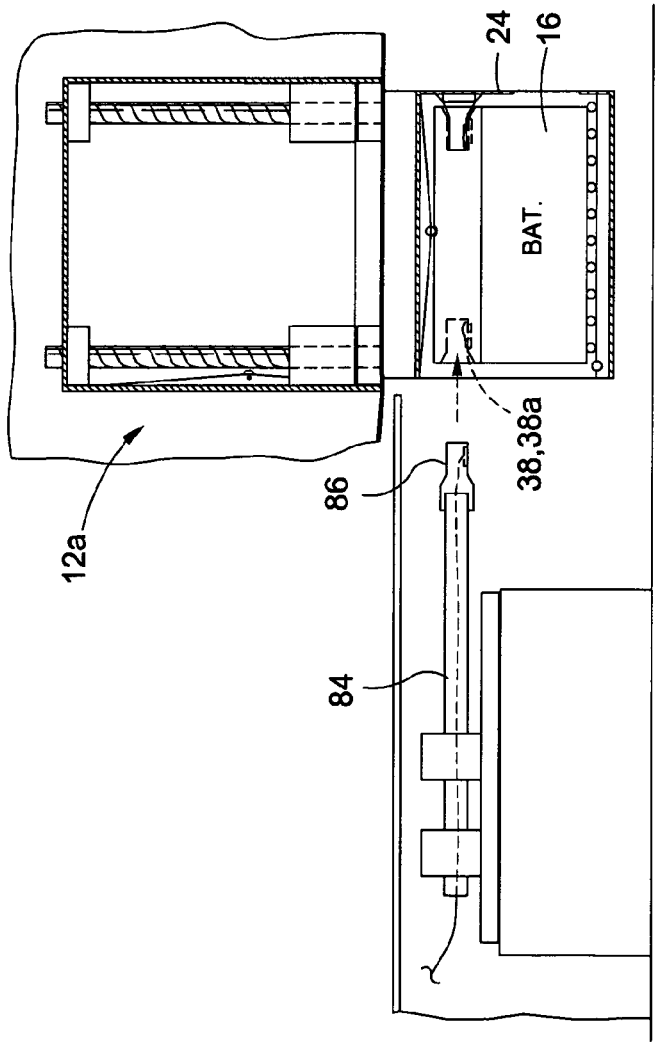
FIG. 19 is a cutaway section view of optional embodiment of automated plug in connector to charge battery packs without any removal.

FIG. 19 shows that vehicle battery pack 16 can be automatically get charged via a linear actuator 84 with plug in probe 86. Vehicle battery pack unit may also have a main charging receptacle connector 92, 92a in the battery carrier rack for receiving automated plug in probe 86 as shown in FIG. 20. In some cases that battery packs doesn't need to be replaced and vehicle is parked, the battery packs can be charged automatically without any manual plug in. This automated charging device can be part of a battery station or it can be part of a separate plug in charging unit.

FIG. 20 illustrate possible terminal connections between the modulated battery pack and its docking enclosure. In this configuration the battery pack 94 can be transfer at either end of its docking enclosure. The provided terminal contacts on the battery's top and side surface 96 makes proper connections with the enclosure terminal contacts 98.

While this invention is susceptible of embodiments in many different forms, this specification and the accompanying drawings disclose only some specific forms as examples of the invention. The invention is not intended to be limited to the embodiments so described; however, the scope of the invention is pointed out in the appended claims.

I claim:

1. A swappable modulated battery pack system for an electric vehicle comprising:
   a battery compartment housing, said battery compartment housing is affixed to said vehicle frame structure;
   a battery carrier rack, said battery carrier rack being slidable within said battery compartment housing via at least one linear actuator, said battery carrier rack being extendable in a linear direction and projecting out in a predetermined displacement away from said battery compartment housing;
   at least one docking enclosure, said docking enclosure being placed and secured within said battery carrier rack, said docking enclosure being fully open at one end and partially open on an opposite end, said docking enclosure having a receptacle connector inside at said partially open end said docking enclosure including a set of rollers mounted to a bottom side thereof;
   at least one detachable modulated battery pack, said modulated battery pack having plug in type connectors at oppositely-facing ends of the battery pack for electrical connection of said battery pack to the vehicle using said plug in type connector on one end of said battery pack or to a charging station using said plug in type connector on said oppositely-facing end of the battery pack, said modulated battery pack being attachably dockable into said docking enclosure from an open end thereof and said modulated battery pack plugging into said docking enclosure receptacle at the end to provide power supply to said electric vehicle, said detachable modulated battery pack being transferrable for exchanging purposes when said battery carrier rack is in an extended position and said modulated battery pack is released, said battery pack being rollable over said rollers mounted to said bottom side of said docking enclosure, said battery pack including a pair of indentations formed in opposite side faces of said battery pack and an indentation formed in a top face of said battery pack; and
   a set of spring-loaded rollers mounted to an opposing pair of side panels of said docking enclosure and being configured to engage said corresponding pair of indentations formed in said opposite side faces of said battery pack and a spring-loaded roller mounted to a top panel of said docking enclosure being configured to engage docking indentation in docking top face of docking battery pack;
   said set of rollers on said bottom side of said docking enclosure for rolling said battery pack and said spring-loaded rollers and corresponding indentations on said side faces and top face of said battery pack being configured to facilitate alignment of said battery pack within said enclosure and alignment of said plug in type connector of said battery pack with a receptacle connector of said docking enclosure during insertion of said battery pack into said docking enclosure.

2. The swappable modulated battery pack system according to claim 1, wherein said battery compartment housing, further includes linear tracks for said battery carrier rack.

3. The swappable modulated battery pack system according to claim 1, wherein said a battery carrier rack, further includes a separate main receptacle connector for charging said modulated battery packs.

4. A The swappable modulated battery pack system according to claim 1, wherein said at least one docking enclosure, further includes a set of guided tracks inside said docking enclosure on top and side panels thereof for guiding said modulated battery pack.

5. The swappable modulated battery pack system according to claim 1, wherein said detachable modulated battery pack further includes charging monitoring circuitry.

6. The swappable modulated battery pack system according to claim 1, wherein said detachable modulated battery pack can have an energy indicator on its frontal case.

* * * * *